United States Patent [19]

Tomiolo

[11] Patent Number: 4,889,997

[45] Date of Patent: Dec. 26, 1989

[54] PROCESS AND DEVICE FOR MEASURING AND PROCESSING THE DISPLACEMENTS BETWEEN TWO OR MORE POINTS IN STRUCTURES, BUILDINGS, MACHINERY OR THE LIKE

[75] Inventor: Andrea Tomiolo, Milan, Italy

[73] Assignee: Carpio S.r.l., Italy

[21] Appl. No.: 135,828

[22] Filed: Dec. 21, 1987

[30] Foreign Application Priority Data

Dec. 23, 1986 [IT] Italy ................ 22832 A/86

[51] Int. Cl.⁴ .............................. G01B 11/14
[52] U.S. Cl. ........................... 250/561; 356/138; 356/152; 33/290
[58] Field of Search ............. 250/561; 356/138, 152; 33/290, 291, DIG. 21

[56] References Cited

U.S. PATENT DOCUMENTS 3,822,943 7/1974 Mason ............................ 356/138
4,674,870 6/1987 Cain et al. ........................ 356/152

Primary Examiner—Vincnet P. McGraw
Assistant Examiner—S. A. Turner
Attorney, Agent, or Firm—Lerner, David, Littenberg, Krumholz & Mentlik

[57] ABSTRACT

A process and device for measuring and processing in real time the changes of level between two or more points in buildings, structures, machinery or the like, when interested by works of civil engineering, wherein a laser ray generated by a laser tube and rotated on a planar or conical surface hits one or more targets constituted by fixed or mobile photodetectors, said targets being placed in correspondence with said points. The signals generated by the targets are transferred to a computer to be processed and immediately read (FIG. 1).

25 Claims, 1 Drawing Sheet

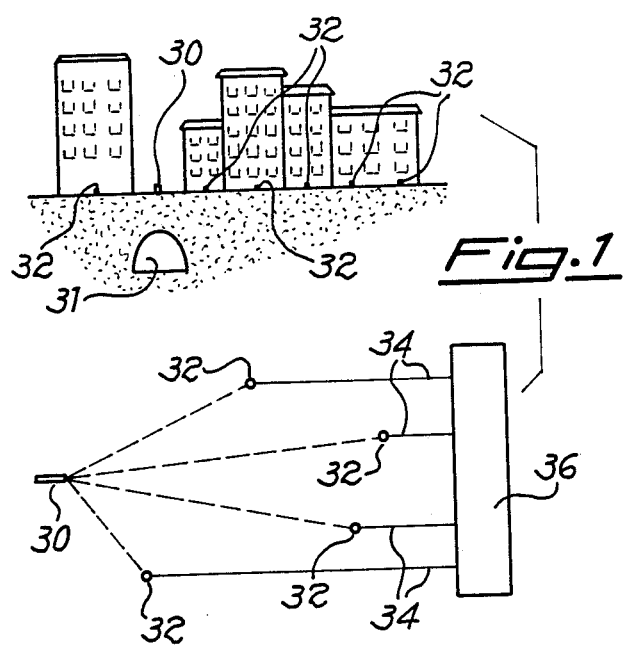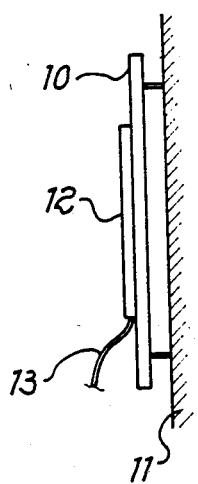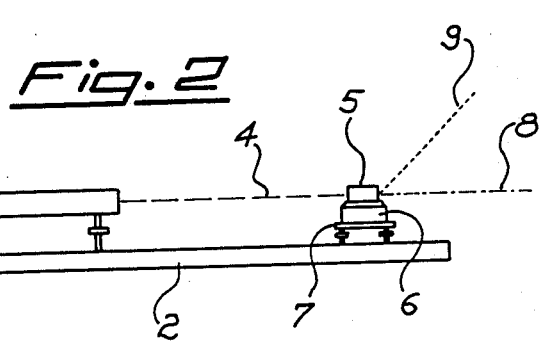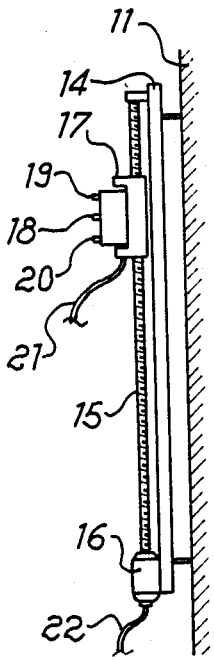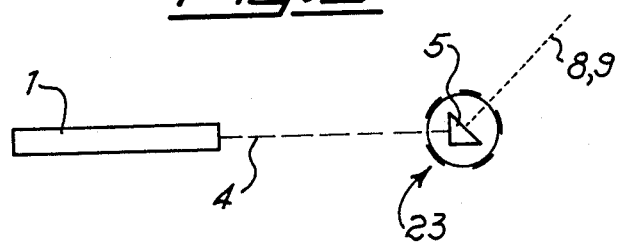

PROCESS AND DEVICE FOR MEASURING AND PROCESSING THE DISPLACEMENTS BETWEEN TWO OR MORE POINTS IN STRUCTURES, BUILDINGS, MACHINERY OR THE LIKE

BACKGROUND OF THE INVENTION

1. Field of the Invention

The present invention concerns a process and a device for the measurement and processing in real time of the level changes which may occur between two or more points in a structure, building, machinery or the like, specially during works of civil engineering directly or indirectly involving the same. Typical examples of said applications can be found in tunnel workings, where phenomena of surface draw can take place related to the changes in the ground tensive state, in particular changes induced works of injection and/or consolidation. The importance of such draws obviously varies in proportion to the distance of the considered points from the tunnel and to several other factors; in urban areas, in any case, said distance is necessarily reduced and therefore there is the need of controlling the effects that said draws have on the buildings located near the tunnel, as the distortions caused may involve structural lesions of considerable importance and even affect the stability of the buildings themselves. The same types of draws can affect the correct positioning of machinery, for instance digging machines.

2. Description of the Prior Art

A possible control consists in using techniques which optimize the operative modes of said workings, but said techniques present a too high degree of approximation, mainly in urban areas, and therefore cannot represent a sufficiently valid method for controlling said phenomena. It is therefore necessary to find a system for controlling and measuring in real time said draw, in order to allow to take in due time the appropriate measures. For this reason, and in any case to maintain the control on the conditions of buildings or machinery during digging operations, as well as for other applications in civil engineering field, so-called communicating vessel level meters are used. Said communicating vessel level meters allow the continuous measurement of differential changes of level in a number of points or stations, between one another or with respect to the level of one station taken as a reference point. The disadvantage of said system lies in the fact that, as indicated by its name, it works according to the principle of the communicating vessels; the system therefore needs a certain number of vessels (one for each station) which must be closed and provided with instruments, partially filled with a liquid and communicating by means of a double connection (liquid side and gas side), as obtained by one or more ducts which must be installed horizontally or, when this is not possible, must be provided with special devices compensating the non horizontal development of the system. The resulting system is consequently rigid and complicated, and its extremely difficult installation makes the use thereof not suitable for limited periods of time, such as those involved during urban workings.

OBJECTS OF THE INVENTIONS

So there still is the need of a system for the continuous measurement in time of the differential changes of level between two or more points, which is flexible and of easy installation. Said need is made even more urgent by the impulse recently given to the development of underground transport in large urban areas.

An object of the present invention is therefore to solve the above mentioned problems by providing a process and a device for measuring in real time the differential changes of level between two or more points in a building, machinery or structure undergoing the effects caused by workings of civil engineering.

SUMMARY OF THE INVENTION

Accordingly, the present invention relates to a process for measuring in real time the differential changes between two or more predetermined points in a building, structure, machinery or the like, in particular when submitted to the effects of works of civil engineering, said process being based on the use of a laser ray and characterized in that it comprises the steps of: positioning a laser tube and a rotating prism assembled on a motor; generating a laser ray; refracting said laser ray by means of said rotating prism to move it along an arc, on a planar or conical surface, as far as to hit in sequence one or more targets located in predetermined points of the work or the like; detecting the position of the interception point of the rotating laser ray on each one of said targets; obtaining a signal proportional to the position of the interception point with respect to a reference level on each target and processing the data obtained according to present modes and standards. Furthermore, the invention relates to a device for measuring in real time the differential changes of level between two or more points or stations in a building, structure, machinery or the like, specially if undergoing the effects of workings of civil engineering, of the type using a laser level meter, characterized in that it comprises a source of laser light, a rotating prism, several targets made integral with said points or stations, one or more signal conditioners/amplifiers provided by the targets because of the impact on them of the laser ray, and at least a computer for storing and processing the obtained signals. It must be noticed that the laser level meters presently known essentially consist in a laser, a receiver and a control panel and are generally applied in agriculture, in the preparation of rice-fields which must present an optimal inclination. This type of application however operates on one target which is moved in the field and does not envisage to simultaneously perform several detections on several fixed targets by means of a single laser.

BRIEF DESCRIPTION OF THE DRAWINGS

The invention will be now described more in detail with reference to the accompanying drawings which are given for illustrative and not limiting purpose and wherein:

FIG. 1 is a general diagram showing the operation of a differential level detecting device according to the invention;

FIG. 2 is a side view of the laser ray emission and refraction unit, which is part of the device of FIG. 1;

FIG. 3 is a view from the top of the lase ray emission and refraction unit;

FIG. 4 is a cross-sectional view of a fixed type target;

FIG. 5 in a cross-sectional view of a mobile type target.

DESCRIPTION OF THE PREFERRED EMBODIMENTS

In the scheme of FIG. 1, a device 30, consisting of a laser tube and a rotating prism, is positioned in a way as to "see" a series of targets 32 fixed for instance to the walls of buildings located in the area involved by the digging work of a tunnel 31.

The targets 32, when hit by the laser ray, emit a signal which is sent, by means of connecting devices 34, to a computer 36, which may be common to all targets.

With reference to FIGS. 2 and 3, a laser tube 1, for instance a gas tube of the Helium-Neon type (He-Ne), is fixed to a base 2 by means of micrometer screws 3, which are used for adjusting the position of the tube itself.

In front of the tube 1, on the side where the laser ray 4 comes out, there is a prism 5 assembled on a motor 6 which is on its turn housed on a support 7 allowing to adjust in a micrometric way the position of the axis of prism 5 and the inclination of its rotation axis with respect to the vertical.

The motor 6 rotates the prism 5 by an angle of 360 degrees or less, at a speed which is preferably low (for example less than 60 r.p.m.), but can also high (for example exceeding 3000 r.p.m.). The ray 4, passing through the rotating prism 5, is then refracted and "sweeps" a surface that can be the surface of a plane 8 or of a cone 9, according to the prism inclination.

The ray rotating on the planar surface 8 or conical surface 9 hits in sequence the targets which have been previously arranged in predetermined positions. The speed of the rotating ray (namely the speed at which the prism 5 is rotated) is preferably not high, but also a high speed of the ray transfer from one target to the subsequent one and a reduced speed of the ray "passage" on the target can also advantageously be used. The targets essentially consist each of a photodetector mounted on a support and can be of the fixed type (diagrammatically shown in FIG. 4) or of the mobile type (FIG. 5). Preferably, around the rotating prism 5, a fixed screen 23 is envisaged, formed by a cylindrical surface provided with a number of openings for the passage of the ray 4 coming from the tube 1 and for the passage of the ray 8 or 9 directed to the targets. The surface presents for instance mobile plates which are removed in correspondence to the alignments with the tube 1 and the targets.

The target of fixed type (FIG. 4) includes a support 10 which can be bonded for instance to the wall 11 of a building; the support 10 bears a photodetector 12, preferably of the continuous type with position cells on a sigle axis, such as for example the photodetectors of the series "LSC" manufactured by United Detector Technology. When the laser ray hits the photodetector 12, it generates a signal which is a function of the distance of the impact point from the end contacts of the photodetector. Said signal is sent through one or more cables 13, or by radio, to a conditioner/amplifier and then to a computer (not shown) which processes and possibly visualizes said signal, together with other similar signals, for their immediate reading. A local yielding of the building causes a level variation of at least one of the photodetector 12 and therefore a change in the signal sent to the computer which processes and possibly visualizes said change by means of a printer and/or a monitor or the like. In case this variation, specially when compared with that of nearby targets, exceeds a preset level of danger, an alarm system is activated.

The target of mobile type (FIG. 5) consists of a support 14, to be fixed for example to the wall 11 of a building, on which a worm screw 15 is mounted and is operated by a motor 16. The screw 15 moves a support 17 which bears a central photodetector 18, a maximum photodetector 19 and a minimum photodetector 20.

According to what is photodetector hit by the laser ray, different signals are generated. When the ray 8 hits the photodetector 19 or 20, the signals generated are sent to the computer through cables 21, or by radio, passing through an amplifier; on the basis of these signals the computer actuates the motor 16 until the photodetector 18 is again at the height of the surface covered by the ray and the motor 16 generates on its turn signals which are sent through cables 22 or by radio to said conditioner/amplifier (not shown) and then to a computer which processes and possibly visualizes said signals by means of a monitor, a printer and the like. The device and the process described allow therefore to obtain in real time the measurement of the change of level in a number of points or stations with respect to a point or station taken as reference and/or with respect to each other, in an extremely simple manner, thus providing a flexible and easy to use system for the control of yieldings in civil or industrial buildings, in machinery supports or the like.

I claim:

1. A process for the real time measurement of differential changes in the position of a plurality of structures, said process comprising generating a laser beam at a predetermined central location with respect to said plurality of structures, rotating said laser beam through a predetermined arc, by refracting said laser beam by means of a rotating prism, screening said rotating laser beam except at points in said predetermined arc corresponding to said targets, providing each of said plurality of structures with a target located at a position subtended by said arc whereby said rotating of said laser beam causes said laser beam to sequentially strike said targets corresponding to said plurality of structures, determining a reference point on each of said targets corresponding to the point on said target struck by said rotating laser beam, obtaining a signal proportional to the location of subsequent points on said target struck by said laser beam upon subsequent rotation thereof, whereby said proportional signals correspond to subsequent changes in the position of said structures, and processing said proportional signals so as to provide an evaluation of the extent of said differential changes in position of said plurality of structures.

2. The process of claim 1 wherein said structures are selected from the group consisting of buildings and machinery.

3. The process of claim 1 wherein said predetermined arc is planar.

4. The process of claim 1 wherein said predetermined arc is conical.

5. The process of claim 1 wherein said predetermined arc is adjusted by adjusting the inclination of the axis of rotation of said prism with respect to the vertical.

6. The process of claim 1 wherein said rotating of said laser beam through said predetermined arc is carried out at a speed of below 60 rpm.

7. The process of claim 1 wherein said rotating of said laser beam through said predetermined arc is carried out at a speed of at least about 3,000 rpm.

8. The process of claim 1 wherein said targets comprise photodetectors.

9. The process of claim 8 wherein said processing of said proportional signals comprises conditioning said signal, amplifying said signal, and providing each of said signals corresponding to said targets to a computer.

10. The process of claim 9 including adjusting the vertical position of said target in response to said proportional signal corresponding to said target.

11. The process of claim 10 including generating a signal corresponding to said adjustment of said target.

12. The process of claim 11 including conditioning said signal corresponding to said adjustment of said target, amplifying said signal, and providing said signal to said computer.

13. A device for the real time measurement of differential changes in the position of a plurality of structures, said device comprising a source of a laser beam, rotating means for rotating said laser beam through a predetermined arc, a plurality of targets mounted on said plurality of structures, each of said plurality of targets being located at a position subtended by said arc, whereby rotation of said laser beam causes said laser beam to sequentially strike said plurality of targets, screen means including a plurality of openings corresponding to said plurality of targets, whereby said laser beam is screened except at locations corresponding to said targets, each of said plurality of targets including signal generation means for generating a signal proportional to the position on said target struck by said laser beam upon rotation thereof, whereby said proportional signals correspond to subsequent changes in the position of said structures, and processing means for processing said proportional signals so as to provide an evaluation of the extent of said differential changes in the position of said plurality of structures.

14. The device of claim 13 wherein said rotating means comprises a rotating prism.

15. The device of claim 13 including signal handling means for handling said signal generated by said signal generation means.

16. The device of claim 15 wherein said signal handling means comprises conditioning means for conditioning said signal and amplifying means for amplifying said signal.

17. The device of claim 13 wherein said source of laser light comprises a laser tube, and including laser tube adjustment means for adjusting the position of said laser tube.

18. The device of claim 17 wherein said laser tube adjustment means comprises micrometer screws.

19. The device of claim 13 wherein said rotating means includes speed adjustment means for rotating said laser beam at a speed ranging from 10 rpm to at least about 3,000 rpm.

20. The device of claim 13 wherein said plurality of targets comprises a plurality of fixed photodetectors of a continuous type, said fixed photodetectors including position cells whereby said signal generating means generates said signal proportional to the distance from the point struck by said laser beam to the edge of said photodetectors.

21. The device of claim 13 wherein said plurality of targets comprise movable photodetectors.

22. The device of claim 21 wherein said movable photodetectors include a central photodetector, a maximum photodetector, and a minimum photodetector, each of said photodetectors being mounted on a movable support.

23. The device of claim 22 wherein said movable support comprises a worm screw.

24. The device of claim 23 including motor means, said worm screw being connected to said motor means.

25. The device of claim 24 including actuation means for actuating said motor means in response to signals from said processing means.

* * * * *